(12) United States Patent
Kim et al.

(10) Patent No.: US 10,323,350 B2
(45) Date of Patent: Jun. 18, 2019

(54) WASHING MACHINE MOTOR AND WASHING MACHINE COMPRISING SAME

(71) Applicant: AMOTECH CO., LTD., Incheon (KR)

(72) Inventors: Byung Soo Kim, Anyang-si (KR); Hyung Hwan Ko, Anseong-si (KR)

(73) Assignee: AMOTECH CO., LTD., Incheon (KR)

( * ) Notice: Subject to any disclaimer, the term of this patent is extended or adjusted under 35 U.S.C. 154(b) by 697 days.

(21) Appl. No.: 14/903,125

(22) PCT Filed: Jul. 18, 2014

(86) PCT No.: PCT/KR2014/006550
§ 371 (c)(1),
(2) Date: Jan. 6, 2016

(87) PCT Pub. No.: WO2015/009106
PCT Pub. Date: Jan. 22, 2015

(65) Prior Publication Data
US 2016/0376741 A1 Dec. 29, 2016

(30) Foreign Application Priority Data

Jul. 19, 2013 (KR) .......... 10-2013-0085533
Oct. 2, 2013 (KR) .......... 10-2013-0118047

(51) Int. Cl.
*H02K 16/00* (2006.01)
*D06F 37/40* (2006.01)
(Continued)

(52) U.S. Cl.
CPC .......... *D06F 37/304* (2013.01); *D06F 37/206* (2013.01); *D06F 37/40* (2013.01);
(Continued)

(58) Field of Classification Search
CPC .......... H02K 16/00; H02K 16/02; H02K 1/27; H02K 5/26; H02K 5/04; H02K 1/18;
(Continued)

(56) References Cited

U.S. PATENT DOCUMENTS 6,257,027 B1 * 7/2001 Imai .................. D06F 37/304
68/12.12
7,578,149 B2 * 8/2009 Schmid .............. D06F 37/206
310/10
(Continued)

FOREIGN PATENT DOCUMENTS

JP 59071780 A * 4/1984
JP 60108087 A * 6/1985
(Continued)

OTHER PUBLICATIONS

KR-20110139434-A (English Translation) (Year: 2011).*
International Search Report—PCT/KR2014/006550 dated Nov. 17, 2014.

*Primary Examiner* — Thomas Truong
*Assistant Examiner* — Alexander Moraza
(74) *Attorney, Agent, or Firm* — Cantor Colburn LLP

(57) ABSTRACT

Provided is a washing machine motor including: an inner rotor connected with an outer shaft; an outer rotor connected with an inner shaft; and a stator disposed with an air gap between the inner rotor and the outer rotor, wherein the outer shaft is rotated at the same speed as that of the inner rotor, and the rotational speed of the inner shaft is decelerated compared to that of the outer rotor so as to increase a torque, and wherein a first bearing and a second bearing are disposed on an outer surface of the outer shaft in order to rotatably support the outer shaft, and the first bearing is mounted in the stator. The washing machine motor includes a planetary gear set that decelerates the rotational speed of (Continued)

the inner shafts and increases the torque, to thereby implement a large-capacity washing machine.

6 Claims, 8 Drawing Sheets

(51) Int. Cl.
    *D06F 37/20*     (2006.01)
    *H02K 1/27*     (2006.01)
    *H02K 1/18*     (2006.01)
    *D06F 37/30*     (2006.01)
    *H02K 16/02*     (2006.01)
    *H02K 21/12*     (2006.01)
    *H02K 1/14*     (2006.01)
    *H02K 7/00*     (2006.01)
    *H02K 7/08*     (2006.01)
    *H02K 7/116*     (2006.01)
    *D06F 37/26*     (2006.01)

(52) U.S. Cl.
    CPC .............. *H02K 1/148* (2013.01); *H02K 7/003* (2013.01); *H02K 7/083* (2013.01); *H02K 7/116* (2013.01); *H02K 16/02* (2013.01); *H02K 21/12* (2013.01); *D06F 37/269* (2013.01); *H02K 1/18* (2013.01); *H02K 1/27* (2013.01)

(58) Field of Classification Search
    CPC ....... H02K 1/148; D06F 37/30; D06F 37/304; D06F 37/36; D06F 37/38; D06F 37/40; D06F 37/206; D06F 37/269
    USPC ... 310/114, 112, 126, 67 R, 83, 90, 99, 156, 310/89, 91; 68/3, 12.14, 12.15, 12.16, 68/13 R, 19, 23 R, 23.4, 23.6, 23.7, 132, 68/134, 139, 140
    See application file for complete search history.

(56) References Cited

U.S. PATENT DOCUMENTS

| | | | |
|---|---|---|---|
| 2004/0139768 A1* | 7/2004 | Kim | D06F 37/304 68/12.24 |
| 2007/0125135 A1* | 6/2007 | Kim | D06F 37/304 68/140 |
| 2010/0050702 A1* | 3/2010 | Kim | D06F 37/304 68/23 R |
| 2013/0160499 A1* | 6/2013 | Kim | A47L 15/0018 68/12.16 |
| 2015/0107382 A1* | 4/2015 | Chang | D06F 17/08 74/17 |

FOREIGN PATENT DOCUMENTS

| | | | | |
|---|---|---|---|---|
| KR | 20040071395 | | 8/2004 | |
| KR | 1020050122556 | | 12/2005 | |
| KR | 1020060006418 | | 1/2006 | |
| KR | 100548310 | | 2/2006 | |
| KR | 20080092023 | | 10/2008 | |
| KR | 20110139434 A | * | 12/2011 | ............. H02K 16/00 |
| KR | 20130044743 | | 5/2013 | |
| KR | 20130051578 | | 5/2013 | |

* cited by examiner

WASHING MACHINE MOTOR AND WASHING MACHINE COMPRISING SAME

TECHNICAL FIELD

The present invention relates to a washing machine motor that can drive a washing tub and a pulsator independently, and a washing machine using the same.

BACKGROUND ART

As disclosed in Korean Patent Registration Publication No. 10-0548310 (Jan. 24, 2006), the conventional washing machine includes: an outer case forming an outer shape; an outer tub which is supported on an inside of the outer case and receives wash water therein; an inner tub which is rotatably accommodated in an inside of the outer tub and is used for both washing and dehydrating; a pulsator which is mounted in an inside of the inner tub relatively rotatably, to form a washing water flow; a drive motor for generating a driving force for rotating the inner tub and the pulsator; an inner tub rotating shaft which receives the driving force of the drive motor for rotating the inner tub; a pulsator rotating shaft which receives the driving force of the drive motor for rotating the pulsator; a sun gear which is connected to the drive motor and is connected to the pulsator rotating shaft; a plurality of planetary gears which are simultaneously engaged with both the sun gear and a ring gear; a carrier supporting the planetary gears so as to be rotated and revolved; and a clutch spring for controlling the rotation of the inner tub and the pulsator during washing or dehydrating.

The conventional washing machine has a planetary gear set including the sun gear, the ring gear, the planetary gears and the carrier, and reduces the rotational force of the drive motor, to then be transferred to the pulsator and the inner tub, and operates the clutch spring to selectively transmit power to the pulsator and the inner tub, to thus rotate only the pulsator or both the pulsator and the inner tub in an identical direction simultaneously.

However, the conventional washing machine needs the planetary gear unit and the clutch spring in order to selectively rotate the pulsator and the inner tub, to accordingly cause the configuration of the conventional washing machine to be complicated and the production cost thereof to increase.

Further, since the conventional washing machine is configured to have the planetary gear set and the clutch spring between the drive motor and the outer tub, the space occupied in the height direction of the washing machine is increased and thus the height of the washing machine increases. Otherwise, since the height of the inner tub should be reduced in an identical height of the washing machine, there is a problem that a washing capacity is reduced.

Furthermore, when the pulsator rotating shaft is rotated in only one direction where the clutch spring is compressed upon dehydration of the conventional washing machine, the clutch spring is tightened to the outer peripheral surfaces of a first clutch drum and a second clutch drum, whereby the pulsator rotating shaft and the inner tub rotating shaft are integrally rotated in an identical direction at an identical speed by the tension of the clutch spring. In this case, conventionally, a bearing rotatable only in one direction is used as a bearing for supporting the planetary gear set.

As a result, since the conventional washing machine has a structure that the pulsator and the inner tub can be rotated only in an identical direction, but cannot be rotated in opposite directions to each other, there is a problem that a variety of wash water flows cannot be formed and there is a limit to improve performance of the washing machine.

Technical Problem

To solve the above problems or defects, it is an object of the present invention to provide a washing machine motor that provides a dual-power while having a double rotor-double stator structure, to thereby independently drive a pulsator and a washing tub, respectively, and eliminate the conventional clutch mechanism to thus simplify the structure of the washing machine motor and to thereby enable the pulsator and the washing tub to be mutually reversely driven, and a washing machine having the same.

It is another object of the present invention to provide a washing machine motor independently driving a pulsator and a washing tub, respectively, and setting a planetary gear set to be rotatable in two-way directions, to thereby enable dual-power and mono-power implementations and form a variety of water flow patterns, and a washing machine having the same.

It is still another object of the present invention to provide a washing machine motor enabling torque conversion by shifting a rotational speed of an inner shaft so as to be appropriate for a large-capacity washing machine and a washing machine having the same.

It is yet another object of the present invention to provide a washing machine in which directions of rotation and rotational speeds of a pulsator and a washing tub are independently controlled, respectively, to thus form a variety of water flow patterns, improve a cleaning capability, improve fabric loose performance, prevent fabric tangling, enable rhythm washability, and control the water flow intensity.

It is still yet another object of the present invention to provide a washing machine motor in which a first bearing for supporting a shaft is mounted in a stator and thus a separate bearing housing for mounting the first bearing is not necessary, to thereby reduce the number of components while simplifying a structure of the washing machine motor, and a washing machine having the same.

The objects of the present invention are not limited to the above-described objects, and other objects and advantages of the present invention can be appreciated by the following description and will be understood more clearly by embodiments of the present invention.

Technical Solution

To accomplish the above and other objects of the present invention, according to an aspect of the present invention, there is provided a washing machine motor comprising: an inner rotor connected with an outer shaft; an outer rotor connected with an inner shaft; and a stator disposed with an air gap between the inner rotor and the outer rotor, wherein the outer shaft is rotated at the same speed as that of the inner rotor, and the rotational speed of the inner shaft is decelerated compared to that of the outer rotor so as to increase a torque, and wherein a first bearing and a second bearing are disposed on an outer surface of the outer shaft in order to rotatably support the outer shaft, and the first bearing is mounted in the stator.

Preferably but not necessarily, the outer shaft comprises: a first outer shaft connected to the inner rotor; and a second outer shaft connected to a washing tub, and the inner shaft comprises: a first inner shaft connected to the outer rotor, and a second inner shaft connected to a pulsator.

Preferably but not necessarily, a planetary gear set is provided between the first inner shaft and the second inner shaft in order to decelerate the rotational speed.

Preferably but not necessarily, the planetary gear set comprises: a ring gear coupling the first outer shaft and the second outer shaft; a sun gear coupled to the first inner shaft; a plurality of planetary gears engaged with an outer surface of the sun gear and an inner surface of the ring gear; and a carrier to which the plurality of planetary gears are rotatably supported and that is connected to the second inner shaft.

Preferably but not necessarily, the first bearing is disposed on an outer surface of the first outer shaft and the second bearing is disposed on an outer surface of the second outer shaft, the first bearing is provided in the stator, and the second bearing is provided in the bearing housing.

Preferably but not necessarily, the stator comprises: a plurality of stator cores that are arranged in an annular form; bobbins that are wrapped on respective outer circumferential surfaces of the plurality of stator cores; a first coil wound on one side of each of the stator cores; a second coil wound on the other side of each of the stator cores; and a stator support in which the plurality of stator cores are arranged in an annular shape and the first bearing is provided.

Preferably but not necessarily, the stator support comprises: a core fixing portion in which the stator cores are arranged and fixed in an annular form; a first bearing mounting portion that is extended inwardly from the core fixing portion and in which the first bearing is provided; and an outer tub fixing portion that is extended outwardly from the core fixing portion and that is fixed to the outer tub.

According to another aspect of the present invention, there is provided a washing machine motor comprising: an inner rotor connected with an outer shaft; an outer rotor connected with an inner shaft; a stator disposed with an air gap between the inner rotor and the outer rotor; and a planetary gear set that is provided in the inner shaft to thus decelerate the speed, wherein a first bearing and a second bearing are disposed on an outer surface of the outer shaft in order to rotatably support the outer shaft, and the first bearing is mounted in the stator.

According to another aspect of the present invention, there is provided a washing machine comprising: an outer tub that accommodates wash water; a washing tub rotatably disposed inside the outer tub to thus perform washing and dewatering; a pulsator rotatably disposed inside the washing tub to thus form wash water flows; and a washing machine motor that independently rotatably drives the washing tub and the pulsator, wherein the washing machine motor comprises: an inner rotor connected with an outer shaft whose front end is connected with the pulsator; an outer rotor connected with an inner shaft whose front end is connected with the washing tub; a stator disposed with an air gap between the inner rotor and the outer rotor; and a planetary gear set that is provided in the inner shaft to thus decelerate the speed, and wherein a first bearing and a second bearing are disposed on an outer surface of the outer shaft in order to rotatably support the outer shaft, and the first bearing is mounted in the stator.

Preferably but not necessarily, the pulsator and the washing tub of the washing machine are driven in different directions and at different speeds from each other, so as to form strong water flows in a pattern form, and the pulsator, or are driven in different directions from each other and at an identical speed to each other, so as to form strong water flows to heighten a cleaning capability.

Preferably but not necessarily, the pulsator and the washing tub of the washing machine are driven at a variable speed to form rhythmic water flows, or are driven in an identical direction to each other and at different speeds from each other, so as to form a vortex to prevent damage to the laundry.

Advantageous Effects

As described above, the present invention provides a washing machine motor that can independently drive a pulsator and a washing tub, respectively, to thus remove an existing clutch mechanism to thereby simplify a structure, and to thus enable the pulsator and the washing tub to be reversely driven to thereby form a variety of wash water flows.

In addition, the washing machine motor according to the present invention is configured to independently drive a pulsator and a washing tub, respectively, to thereby enable dual-power and mono-power implementations and form a variety of water flow patterns, to thereby improve performance of a washing machine.

Further, the washing machine motor according to the present invention is configured to employ a planetary gear set in any one of the inner shaft and an outer shaft that are respectively connected to a washing tub and a pulsator, to thus decelerate a rotational speed thereof to thereby increase a torque and to implement a large-capacity washing machine.

Further, the washing machine motor according to the present invention includes a first bearing and a second bearing provided on the outer surface of the outer shaft in order to support the outer shaft, in which the first bearing is provided in the stator and thus a separate bearing housing for mounting the first bearing is not required, to thus simplify the structure and reduce the number of parts.

BEST MODE

Figure 1:
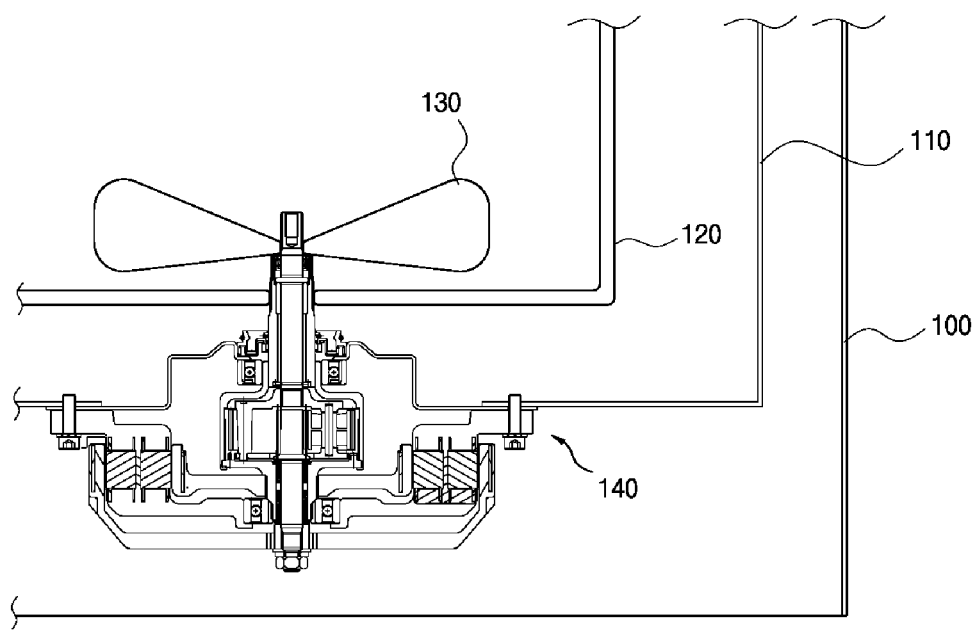
FIG. 1 is across-sectional view of a washing machine according to an embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user's or operator's intention, or the custom. Definitions of these terms herein need to be made based on the contents across the whole application.

Figure 2:
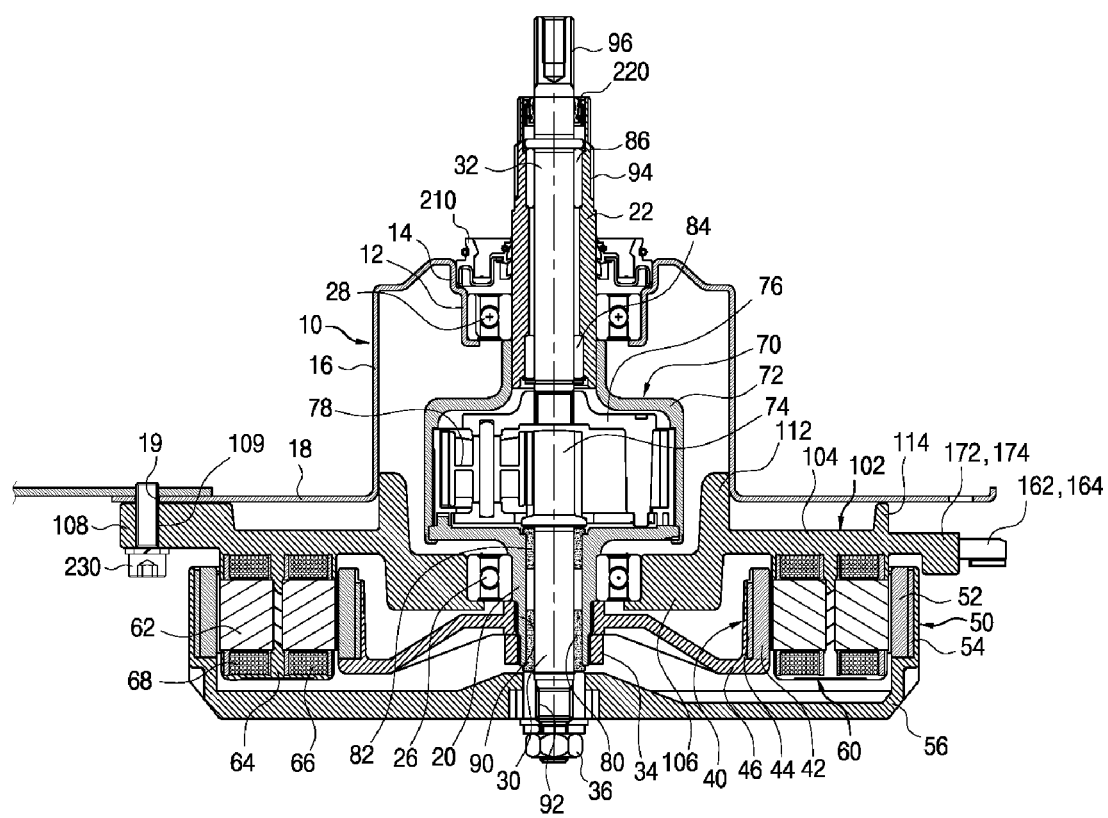
FIG. 2 is a cross-sectional view of a washing machine motor according to an embodiment of the present invention.

FIG. 1 is across-sectional view of a washing machine according to an embodiment of the present invention, and FIG. 2 is a cross-sectional view of a washing machine motor according to an embodiment of the present invention.

Referring to FIGS. 1 and 2, a washing machine according to an embodiment of the present invention includes: a case 100 forming an outer appearance; an outer tub 110 which is disposed in an inside of the case 100 and accommodating washing water; a washing tub 120 which is rotatably disposed inside the outer tub 110 to perform washing and dehydrating; a pulsator 130 which is rotatably disposed inside the washing tub 120 to form washing water flows; and a washing machine motor 140 which is mounted on a lower portion of the washing tub 120, to drive the washing tub 120 and the pulsator 130 simultaneously or selectively.

As shown in FIG. 2, the washing machine motor 140 includes: outer shafts 20 and 22 connected to the washing tub 120; inner shafts 30 and 32 rotatably disposed inside the outer shafts 20 and 22 and connected to the pulsator 130; an inner rotor 40 connected to the outer shafts 20 and 22; an outer rotor 50 connected to the inner shafts 30 and 32; and a stator 60 disposed between the inner rotor 40 and the outer rotor 50 with an air gap.

A planetary gear set 70 is mounted in any one of the inner shafts 30 and 32 and the outer shafts 20 and 22, to reduce the rotational speeds thereof and increase the torque thereof.

In this embodiment, the planetary gear set 70 is mounted in the inner shafts 30 and 32 so as to reduce the rotational speeds of the inner shafts 30 and 32 and increase the torque thereof.

Here, when the pulsator 130 is connected to the inner shafts 30 and 32, the planetary gear set 70 is provided in the inner shafts 30 and 32 to thereby decelerate the rotational speed of the inner shafts 30 and 32.

The outer shafts 20 and 22 are formed in a cylindrical shape so that the inner shafts 30 and 32 pass through the outer shafts 20 and 22, respectively, and include a first outer shaft 20 coupled to the inner rotor 40, and a second outer shaft 22 coupled to the washing tub 120.

Then, the inner shafts 30 and 32 include a first inner shaft 30 coupled to the outer rotor 50 and a second inner shaft 32 coupled to the pulsator 130.

Figure 3:
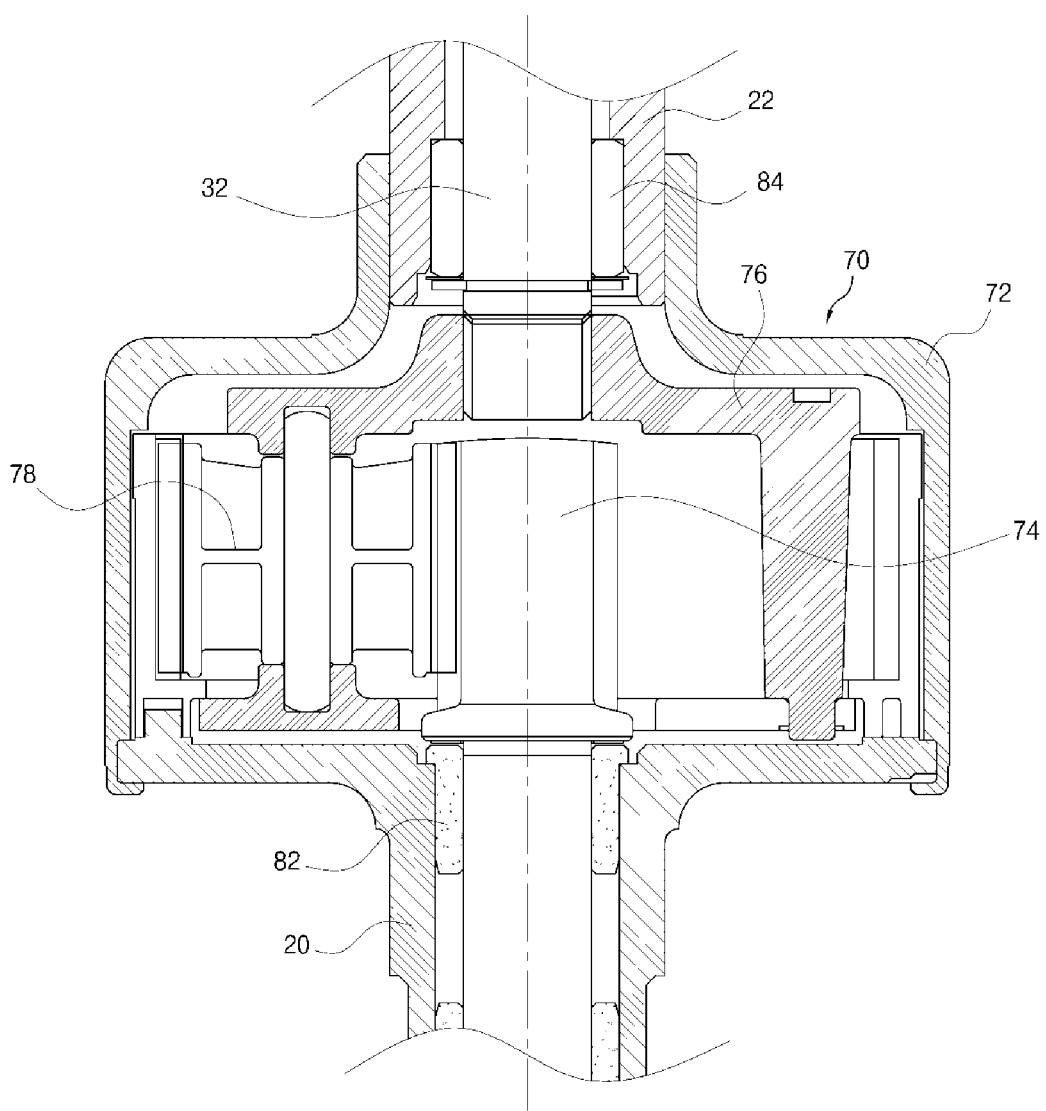
FIG. 3 is a cross-sectional view of a planetary gear set according to an embodiment of the present invention.

As shown in FIG. 3, the planetary gear set 70 includes: a ring gear 72 connecting between the first outer shaft 20 and the second outer shaft 22; a sun gear 74 integrally coupled to the first inner shaft 30; a plurality of planetary gears 78 engaged with an outer surface of the sun gear 74 and an inner surface of the ring gear 72; and a carrier 76 to which the plurality of planetary gears 78 are rotatably supported and that is connected to the second inner shaft 32.

The planetary gear set 70 is configured so that the first outer shaft 20 and the second outer shaft 22 are connected by the ring gear 72 and thus the rotational speed of the first outer shaft 20 is transferred to the second outer shaft 22. Therefore, the rotating speed of the first outer shaft 20 is the same as that of the second outer shaft 22.

In addition, the first inner shaft 30 is formed integrally with the sun gear 74, and the second inner shaft 32 is spline-coupled with the carrier 76. The carrier 76 is rotatably supported in the center of the planetary gears 78. As a result, the rotational speed of the first inner shaft 30 is decelerated to then be transmitted to the second inner shaft 32.

In this way, the inner shafts 30 and 32 are interconnected via the planetary gear set 70 to thus decelerate the rotational speed of the outer rotor 50 to then be transmitted to the pulsator 130, to thereby increase the torque of the pulsator 130 and accordingly be applicable to a large-capacity washing machine.

A first sleeve bearing 80 and a second sleeve bearing 82 both of which are formed in a cylindrical shape are provided between an outer circumferential surface of the first inner shaft 30 and an inner circumferential surface of the first outer shaft 20, to thus rotatably support the first inner shaft 30.

A third sleeve bearing 84 and a fourth sleeve bearing 86 are provided on upper and lower inner surfaces of the second outer shaft 22, respectively, to thus rotatably support the second inner shaft 32.

A first link 90 to which an inner rotor support 46 of the inner rotor 40 is connected is formed on an outer surface of the first outer shaft 20 and a second link 92 to which an outer rotor support 56 of the outer rotor 50 is connected is formed on a lower end of the first inner shaft 30.

The first link 90 and the second link 92 may be serration-coupled or spline-coupled through protrusions formed on the outer surfaces of the first outer shaft 20 and the first inner shaft 30, or mutually key-coupled through key grooves formed on the outer surfaces of the first outer shaft 20 and the first inner shaft 30.

Here, a first locking nut 34 is screwed and coupled at the lower end of the first outer shaft 20, in which the first locking nut 34 prevents the departure of the inner rotor support 46 of the inner rotor 40 from the first outer shaft 20, and a second locking nut 36 is screwed and coupled at the lower end of the first inner shaft 30, in which the second locking nut 36 prevents the departure of the outer rotor support 56 of the outer rotor 50 from the first inner shaft 30.

A third link 94 is formed on the upper outer surface of the second outer shaft 22 in which the washing tub 120 is connected to the third link 94, and a fourth link 96 is formed on the upper outer surface of the second inner shaft 32 in which the pulsator 130 is connected to the fourth link 96.

The third link 94 and the fourth link 96 may be serration-coupled or spline-coupled through protrusions formed on the outer surfaces of the second outer shaft 22 and the second inner shaft 32, or mutually key-coupled through key grooves formed on the outer surfaces of the second outer shaft 22 and the second inner shaft 32.

A first seal 220 is mounted between the second outer shaft 22 and the second inner shaft 32 to prevent the washing water from leaking, and a second seal 210 is mounted between the second outer shaft 22 and a bearing housing 10 to prevent the washing water from leaking.

A first bearing 26 is disposed on the outer surface of the first outer shaft 20, to thus rotatably support the first outer shaft 20 and a second bearing 28 is disposed on the outer surface of the second outer shaft 22, to thus rotatably support the second outer shaft 22.

The first bearing 26 is provided in the stator 60 and the second bearing 28 is provided in the bearing housing 10. Thus, since the first bearing 26 is mounted in the stator 60, no separate bearing housing for mounting the first bearing is unnecessary, thereby reducing the number of parts required, shortening the production process and further reducing the size of the motor.

Figure 6:
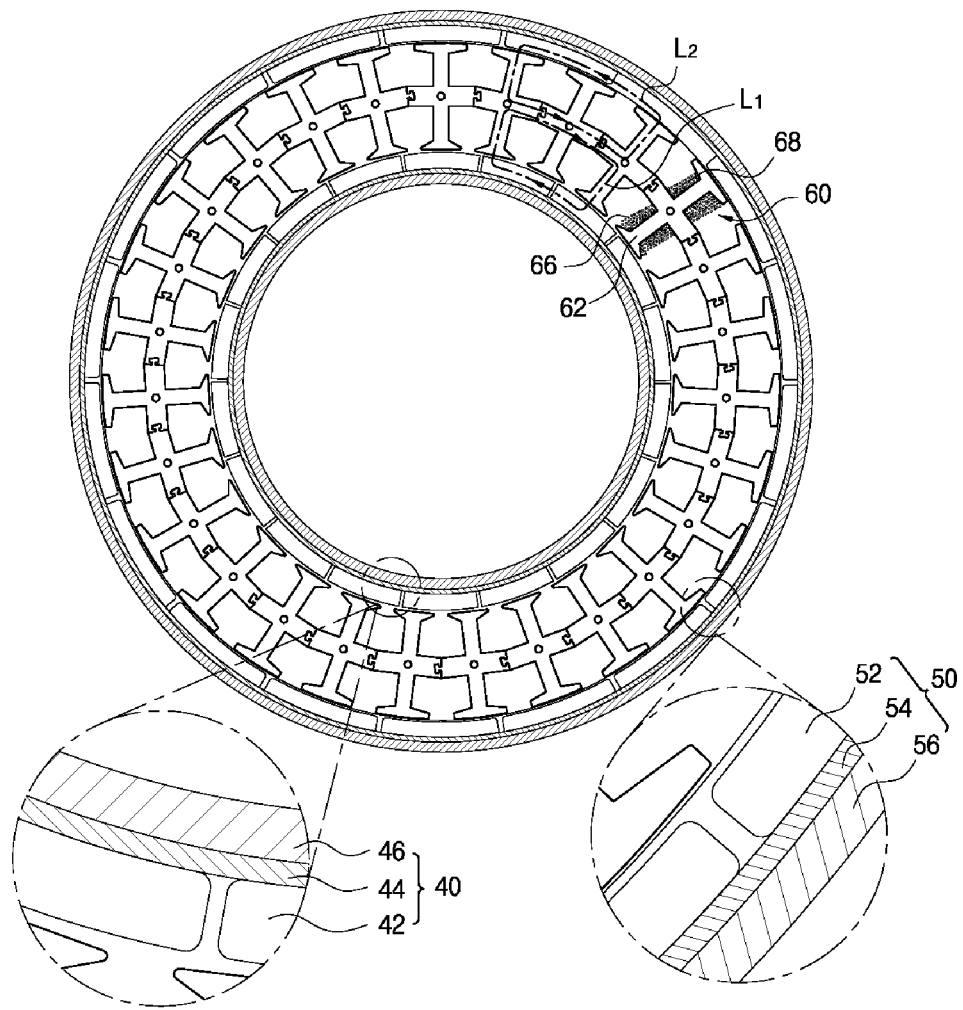
FIG. 6 is a horizontal cross-sectional view of a washing machine motor according to another embodiment of the present invention.
Figure 7:
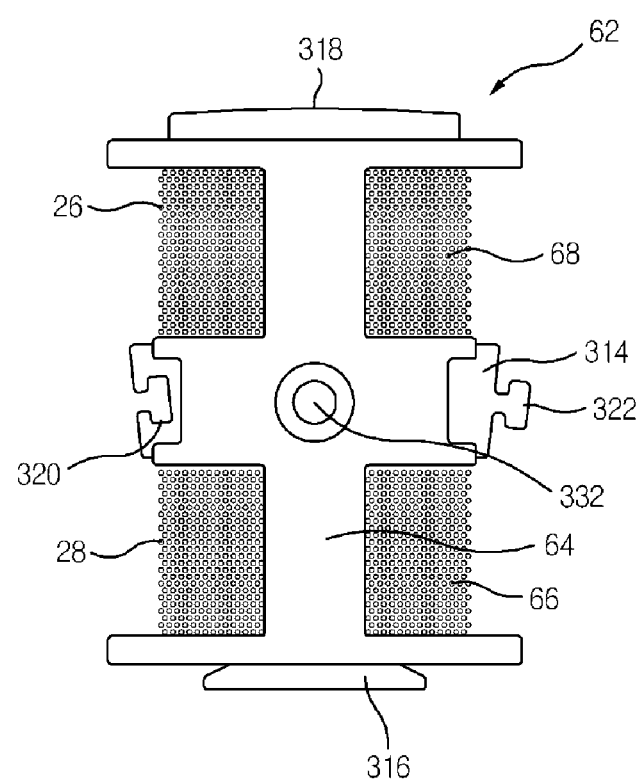
FIG. 7 is a cross-sectional view of a stator according to an embodiment of the present invention.
Figure 8:
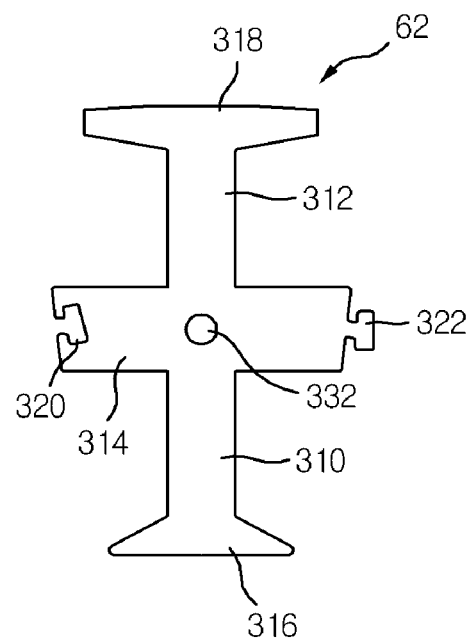
FIG. 8 is a cross-sectional view of a stator core according to an embodiment of the present invention.

As shown in FIGS. 6 to 8, the stator 60 includes: a plurality of stator cores 62 that are formed of a split type and arranged in an annular shape; non-magnetic bobbins 64 that are configured to wrap the outer circumferential surfaces of the plurality of stator cores 62, respectively; a first coil 66 that is wound on one side (an inner side) of each of the stator cores 62; a second coil 68 that is wound on the other side (an outer side) of each of the stator cores 62; and a stator support 102 in which the plurality of stator cores 62 are arranged in an annular shape and that is fixed to the outer tub 110.

The stator support 102 is integrally formed with the stator cores 62 by an insert molding method after arranging the plurality of stator cores 62 with a certain interval in the circumferential direction thereof in a mold.

In other words, the stator support 102 is molded by the insert molding method by molding a thermosetting resin, for example, a BMC (Bulk Molding Compound) molding material such as polyester. In this case, the plurality of stator cores 62 are arranged with a certain interval in the circumferential direction thereof in a mold, and thus are integrally formed.

Other than the structure that the stator support 102 is integrally formed with the stator cores 62 by insert molding, the stator support 102 may be separately manufactured from the stator cores 62 and then coupled with the stator cores 62 by using bolts.

The stator support 102 includes: a core fixing portion 104 in which the stator cores 62 are arranged and fixed in an annular form; a first bearing mounting portion 106 that is extended inwardly from the core fixing portion 104 and in which the first bearing 26 is provided; and an outer tub fixing portion 108 that is extended outwardly from the core fixing portion 104 and that is fixed to the outer tub 110.

The first bearing mounting portion 106 is formed in a stepped shape so that the first bearing 26 is mounted on the inner surface of the stator support 102 to thereby prevent the separation of the first bearing 26.

In addition, a fastening hole 109 is formed in the outer tub fixing portion 108, to then be fastened to the bearing housing 10 with bolts 230.

The bearing housing 10 is formed of a metallic material, and includes: a second bearing mounting portion 12 in which the second bearing 28 is mounted; a seal fastener 14 that is bent upwardly from the second bearing mounting portion 12 and in which the second seal 210 is mounted; a link 16 that is bent downwardly from the seal fastener 14 to thus have a cylindrical shape; and a flat plate portion 18 that is extended horizontally outwardly from a lower end of the link 16 and that are coupled with the stator support 102 and the outer tub 110.

A plurality of coupling holes 19 are formed in the flat plate portion 18, in which the plurality of coupling holes 19 are in communication with a plurality of fastening holes 109 formed in the stator 60 and fastened to the outer tub 110 with bolts 230.

A first alignment projection 112 and a second alignment projection 114 are formed in the stator support 102, in which the first alignment projection 112 is extended in a cylindrical shape upwardly from the stator support 102 and is in contact with the inner surface of the link 16 of the bearing housing 10, and the second alignment projection 114 is formed with a gap outwardly from the first alignment projection 112 and is in contact with the lower surface of the flat plate portion 18 of the bearing housing 10.

In this way, when assembling the stator 60, the first alignment projection 112 contacts the inner surface of the bearing housing 10 to align the right and left positions, and the second alignment projection 114 contacts the lower surface of the bearing housing 10 to align the top and bottom positions.

Figure 4:
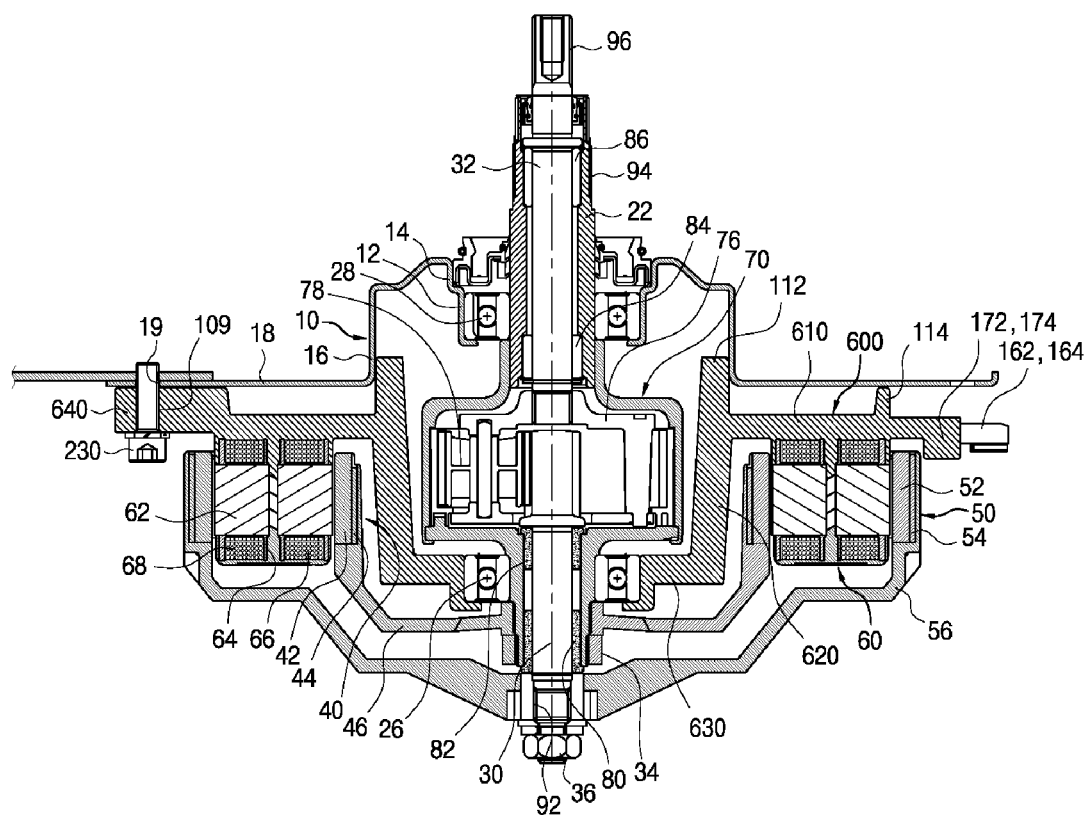
FIG. 4 is a cross-sectional view of a washing machine motor according to an embodiment of the present invention.

As shown in FIG. 4, the stator support 600 in accordance with another embodiment includes: a core fixing portion 610 in which the stator cores 62 are arranged and fixed in an annular form; a cover portion 620 that is extended downwardly from an inner surface of the core fixing portion 610 and wraps the outer surface of the planetary gear set 70; a first bearing mounting portion 630 that is extended inwardly from the cover portion 620 and in which the first bearing 26 is provided; and an outer tub fixing portion 640 that is extended outwardly from the core fixing portion 610 and that is fixed to the outer tub 110.

The stator support 600 according to another embodiment as described above includes the cover portion 620 that wraps the outer surface of the planetary gear set 70, to thus serve to protect the planetary gear set 70 simultaneously.

Figure 5:
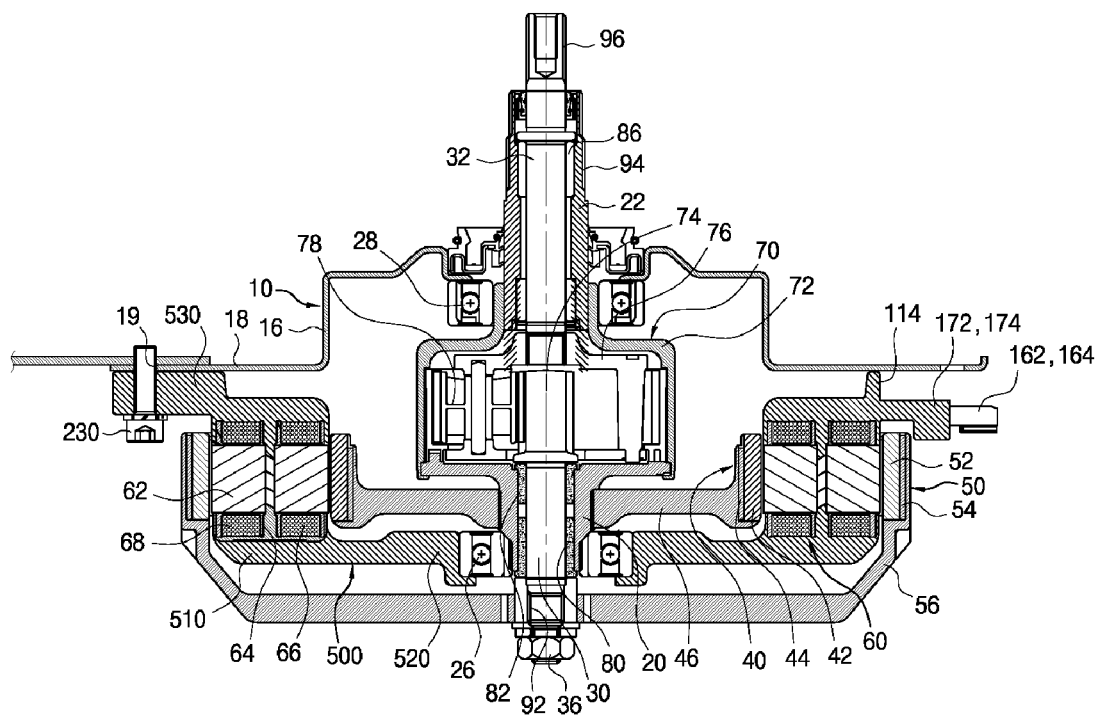
FIG. 5 is a cross-sectional view of a washing machine motor according to another embodiment of the present invention.

As shown in FIG. 5, the stator support 500 according to still another embodiment includes: a core fixing portion 510 in which the stator cores 62 are arranged and fixed in an annular form; a first bearing mounting portion 520 that is extended inwardly from a lower surface of the core fixing portion 510 and in which the first bearing 26 is provided; and an outer tub fixing portion 530 that is extended outwardly from an upper surface of the core fixing portion 510 and that is fixed to the outer tub 110.

The stator support 500 according to still another embodiment as described above includes the outer tub fixing portion 530 that is extended outwardly from an upper surface of the core fixing portion 510 to which in which the stator cores 62 are fixed and that is fixed to the outer tub 110, and the first bearing mounting portion 520 that is extended inwardly from a lower surface of the core fixing portion 510 and in which the first bearing 26 is provided, thereby reducing the overall height of the motor.

The inner rotor 40 includes: a plurality of first magnets 42 that are disposed on the inner surface of the stator 60 with a certain gap; a first back yoke 44 disposed on the rear surfaces of the plurality of first magnets 42; and an inner rotor support 46 that is integrally formed with the first magnets 42 and the first back yoke 44 by an insert molding method.

Here, the inner rotor support 46 is integrally formed with the plurality of first magnets 42 and the first back yoke 44 by molding a thermosetting resin, for example, a BMC (Bulk Molding Compound) molding material such as polyester. Thus, the inner rotor 40 may have waterproof performance, and shorten the manufacturing process.

The inner rotor support 46 is formed in a circular plate shape with the center thereof opened. The inner surface of the inner rotor support 46 is connected to the first link 90 of the first outer shaft 20 and is rotated with the first outer shaft 20, and the first magnets 42 and the first back yoke 44 are integrally formed on the outer surface of the inner rotor support 46.

Then, the outer rotor 50 includes: a plurality of second magnets 52 that are disposed on the outer surface of the stator 60 with a certain gap; a second back yoke 54 disposed on the rear surfaces of the plurality of the second magnets 52; and an outer rotor support 56 that is integrally formed with the second magnets 52 and the second back yoke 54 by an insert molding method.

Here, the outer rotor support 56 is integrally formed with the plurality of second magnets 52 and the second back yoke 54 by molding a thermosetting resin, for example, a BMC (Bulk Molding Compound) molding material such as polyester. Thus, the outer rotor 50 may have waterproof performance, and shorten the manufacturing process.

The outer rotor support 56 is formed in a circular plate shape with the center thereof opened. The inner surface of the outer rotor support 56 is connected to the second link 92 of the first inner shaft 30 and is rotated with the first inner shaft 30, and the second magnets 52 and the second back yoke 54 are integrally formed on the outer surface of the outer rotor support 56.

As shown in FIGS. 6 to 8, each of the stator cores 62 includes: a first tooth portion 310 on which the first coil 66 is wound; a second tooth portion 312 formed in opposition to the first tooth portion 310 and on which the second coil 68 is wound; a partition 314 that partitions between the first tooth portion 310 and the second tooth portion 312; and couplers 320 and 322 that are formed at both ends of the partition 314 and interconnect the stator cores 62 adjacent to each other.

Here, a first output of a first inverter 530 is applied to the first coil 66 and a second output of a second inverter 540 is applied to the second coil 68. Accordingly, when the first output is applied to only the first coil 66, only the inner rotor 40 is rotated, when the second output is applied to only the second coil 68, only the outer rotor 50 is rotated, and when the first output and the second output are simultaneously applied to the first coil 66 and second coil 68, respectively, both the inner rotor 40 and outer rotor 50 are rotated.

A throughhole 332 is formed at the center of the partition 314 to thus serve to prevent a first magnetic circuit $L_1$ formed by the first coil 66 and a second magnetic circuit $L_2$ formed by the second coil 68 from interfering with each other. The throughhole 332 may be formed long in the lateral direction of the partition 314, in a slot type, in addition to the circular shape.

A first flange 316 is formed at the end of the first tooth portion 310 so as to be disposed to face the first magnets 42 and a second flange 318 is formed at the end of the second tooth portion 312 so as to be disposed to face the second magnets 52.

The first flange 316 and the second flange 318 are formed to have inward and outward curved surfaces at predetermined curvatures, respectively, to correspond to the first magnet 42 of the inner rotor 40 and the second magnet 52 of the outer rotor 50. Thus, the roundness of the inner circumferential surface and the outer circumferential surface of the stator core 62 is increased and thus certain magnetic gaps can be maintained between the inner circumferential surface of the stator 60 and the first magnet 42 and between the outer circumferential surface of the stator 60 and the second magnet 52, respectively, although the inner circumferential surface and outer circumferential surface of the stator 60 are proximate to the first magnet 42 and the second magnet 52.

The stator cores 62 should have a structure of being directly connected to each other so that a magnetic circuit can be formed between the stator cores 62. Thus, the couplers 320 and 322 have a structure that the stator cores 62 are directly connected with each other so as to be energized between the stator cores 62 each other.

As an example, these couplers 320 and 322 are configured so that a coupling protrusion 322 is protrudingly formed at one side of the partition 314 and a coupling groove 320 with which the coupling protrusion 322 is fitted and coupled is formed at the other side of the partition 314. Thus, when the coupling protrusion 322 of one stator core 62 is fitted into and coupled with the coupling groove 320 of another stator core 62 adjacent to the one stator core 62, the stator cores 62 are radially arranged, and have a directly cross-linked structure that the stator cores 62 are directly connected with each other.

In addition to the above structure, the couplers have a structure that pinholes are formed at both end portions of the partition of each of the stator cores, and a pin member is fitted into and coupled with the pinholes of two stator cores at a state where the stator cores 62 contact each other, to thereby employ a structure of connecting between the stator cores. Alternatively, the couplers may employ a method of caulking the stator cores by using a caulking member in a state where the stator cores contact each other.

Connectors 162 and 164 are mounted on the outside of the stator support 102, in which the connectors 162 and 164 apply the outputs of the first and second inverters 530 and 540 to the first coil 66 and second coil 68, respectively. The connectors 162 and 164 include a first connector 162 to which the first output of the first inverter 530 applied to the first coil 66 is connected in order to rotate the washing tub 120, and a second connector 164 to which the second output of the second inverter 540 applied to the second coil 68 is connected in order to rotate the pulsator 130.

A first connector fixing portion 172 to which the first connector 162 is fixed and a second connector fixing portion 174 to which the second connector 164 is fixed are formed on the outer surface of the stator support 102, respectively.

Here, the first connector fixing portion 172 and the second connector fixing portion 174 are integrally formed at the time of insert injection molding of the stator support 102. In other words, when the first connector 162 and the second connector 164 are placed in a mold and are subjected to insert molding, the first connector fixing portion 172 is wrapped on the outer surface of the first connector 162 and thus the first connector 162 is fixed, and the second connector fixing portion 174 is wrapped on the outer surface of the second connector 164 and thus the second connector 164 is fixed.

The washing machine motor 140 according to an embodiment of the present invention forms a first magnetic circuit $L_1$ between the inner rotor 40 and one side of the stator 60 where the first coil 66 is wound, and forms a second magnetic circuit $L_2$ between the outer rotor 50 and the other side of the stator 60 where the second coil 68 is wound, to thus form a pair of magnetic circuits each independent to each other. As a result, the inner rotor 40 and the outer rotor 50 can be respectively driven separately.

More specifically, the first magnetic circuit $L_1$ includes the first magnet 42 of the N-pole, the first tooth portion 310 on which the first coil 66 is wound, an inner part of the partition 314, the adjacent first tooth portion 310, the first magnet 42 of the S-pole adjacent to the first magnet 42 of the N-pole, and the first back yoke 44.

In addition, the second magnetic circuit $L_2$ includes the second magnet 52 of the N-pole, the second teeth portion 312 facing the second magnet 52 of the N-pole and on which the second coil 68 is wound, an outer part of the partition 314, the adjacent second teeth portion 312, the second magnet 52 of the S-pole, and the second back yoke 54.

The function of the washing machine motor according to an embodiment of the present invention will now be described.

Figure 9:
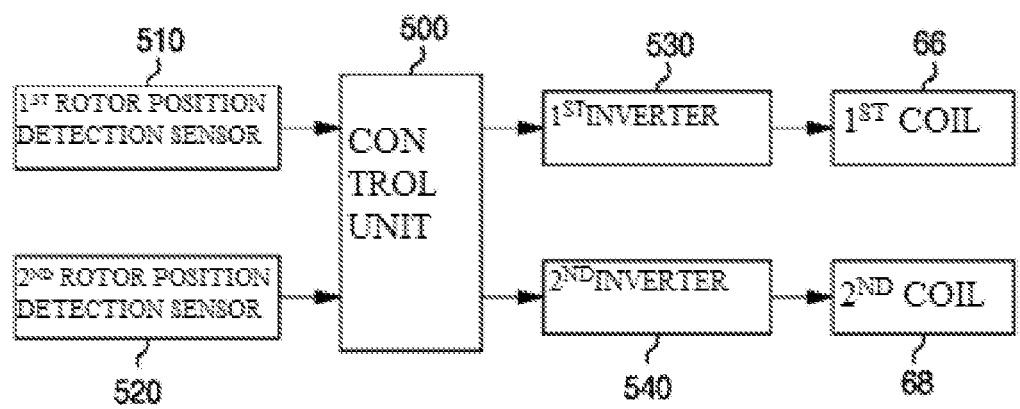
FIG. 9 is a block diagram of a washing machine control apparatus according to an embodiment of the present invention.

Referring to FIG. 9, a washing machine control apparatus according to an embodiment of the present invention includes: a first inverter 530 for generating a first drive signal applied to the first coil 66; a second inverter 540 for generating a second drive signal applied to the second coil 68, and a control unit 500 for controlling the first inverter 530, the second inverter 540 and the entire washing machine.

The control unit 500 is configured to play a role of a system control unit that serves to control the first and second inverters 530 and 540, and simultaneously the entire washing machine as described above, or is configured to function as a driver dedicated control unit that receives a washing control signal that is determined according to a washing course set by a user from a system control unit of a main body of a washing machine and then applies individual control signals to the first and second inverters 530 and 540 based on the washing control signal. The control unit 500 may be implemented by using a signal processor such as a microcomputer or a microprocessor.

According to an embodiment of the present invention, the washing machine motor 140 has a double rotor-double stator dual-power structure, for example, the motor control thereof is performed by a U, V, W three-phase drive method. Therefore, the first and second coils 66 and 68 of the stator 60 are formed to include U, V, and W 3-phase coils, respectively. The first coil 66 wound on the first tooth portion 310 that is extended in a central direction from the stator 60 forms an inner stator, and the second coil 68 wound on the second tooth portion 312 that is extended in a radial direction from the stator 60 forms an outer stator.

As a result, the inner rotor 40 that is rotated by the inner stator forms an inner motor, and the outer rotor 50 that is rotated by the outer stator forms an outer motor. The motor structures of the inner motor and the outer motor are designed so as to be controlled in a BLDC method, respectively, and the first and second inverters 530 and 540 perform a drive control, for example, a six-step drive control method.

The first and second inverters 530 and 540 can be made of three pairs of switching transistors connected in a totem pole structure, respectively. The three-phase outputs from the respective inverters are applied to the U, V, W 3-phase coils of the first and second coils 66 and 68, respectively.

The control unit 500 that controls the first and second inverters 530 and 540 detects the rotational positions of the inner rotor 40 and the outer rotor 50 from first and second rotor position detection sensors 510 and 520, respectively, for example, Hall sensors and applies control signals of a PWM mode to the first and second inverters 530 and 540. In this case, the first and second inverters 530 and 540 apply the U, V, W 3-phase outputs to the U, V, W 3-phase coils of the first and second coils 66 and 68, respectively, to thereby rotatably drive the inner rotor 40 and the outer rotor 50.

Accordingly, the control unit 500 according to an embodiment of the present invention controls the first and second inverters 530 and 540 to thereby optionally and independently apply the outputs of the first and second inverters 530 and 540 to the first and second coils 66 and 68, respectively. Accordingly, the inner rotor 40 and the outer rotor 50 can be selectively and independently rotatably driven.

In addition, the planetary gear set 70 is configured so that the ring gear 72 is connected between the first and second outer shafts 20 and 22, and the first and second outer shafts 20 and 22 are rotatably supported in two-way directions by the first and second bearings 26 and 28 that are rotatable in two-way directions. Therefore, the planetary gear set 70 is also rotatably supported in two-way directions.

Thus, a washing machine according to an embodiment of the present invention employs the washing machine motor 140 having a double rotor-double stator structure, and adopts first and second inverters 530 and 540 to apply the U, V, W 3-phase outputs to the U, V, W 3-phase coils of the first and second coils 66 and 68 to independently rotatably drive the inner rotor 40 and the outer rotor 50. As a result, the rotational forces of the inner rotor 40 and the outer rotor 50 are applied to the pulsator 130 and the washing tub 120, through the inner shafts 30 and 32, the outer shafts 20 and 22, and the planetary gear set 70, to independently drive the pulsator 130 and the washing tub 120. In addition, the planetary gear set 70 is supported by the first and second bearings 26 and 28 both of which enable two-way rotation, to thereby control the rotational directions and the rotational speeds of the pulsator 130 and the washing tub 120, to thus form a variety of water flows.

Controlling the washing machine using the above-described washing machine motor 140 will be described as follows.

First, when only the pulsator 130 is driven during a washing stroke, and the second output is applied to the second coil 68 from the second inverter 540, the outer rotor 50 is rotated and the first inner shaft 30 connected to the outer rotor 50 is rotated. Then, the rotational speed is decelerated by the planetary gear set 70 coupled to the first inner shaft 30 to then be transmitted to the second inner shaft 32, and the pulsator 130 connected to the second inner shaft 32 is rotated.

In this way, the rotational speed directed to the pulsator 130 is reduced by the planetary gear set 70 and the torque thereof is increased. Thus, the washing machine motor according to the embodiment of the present invention can be applied to a large-capacity washing machine.

Further, when both the pulsator 130 and the washing tub 120 are simultaneously rotated during a dehydration stroke and a rinsing stroke, the first and second outputs from the first and second inverters 530 and 540 are respectively applied to the first coil 66 and the second coil 68. Then, the inner rotor 40 is rotated by the magnetic circuit $L_1$, and thus the outer shaft 20 associated with the inner rotor 40 is rotated, to thereby rotate the washing tub 120. Then, the outer rotor 50 is rotated by the magnetic circuit by $L_2$, and thus the inner shaft 30 connected to the outer rotor 50 is rotated to thereby rotate the pulsator 130.

In addition, when the pulsator 130 and the washing tub 120 are reversely rotated to each other for the washing stroke, rinsing stroke, and a fabric detangle stroke for removing laundry tangle such as laundry jam, the inverter outputs are applied to the first coil 66 and the second coil 68 simultaneously or with a time delay, and the first inverter output applied to the first coil 66 and the second inverter output applied to the second coil 68 are each controlled independently, to thereby rotate the pulsator 130 and the washing tub 120 in opposite directions to each other while rotating the inner rotor 40 and the outer rotor 50 in opposite directions to each other.

Further, a variety of wash water flows can be formed by rotating the pulsator 130 and the washing tub 120 in an identical direction at an identical speed, or in an identical direction at respectively different speeds, during a washing stroke and a rinsing stroke.

As described above, when driving the pulsator 130 and the washing tub 120 in different directions and at an identical speed, according to the embodiment of the present invention, it is possible to form strong washing water flows, and when driving the pulsator 130 and the washing tub 120 in different directions and at different speeds, it is possible to form various patterns of strong washing water flows.

In particular, when the pulsator 130 and the washing tub 120 are driven in different directions and at different speeds, strong vertical rising/falling water flows by the pulsator and a vortex by the washing tub are created, to thereby improve a cleaning capability and improve rinsing performance.

In some embodiments, the rotation speeds of the pulsator 130 and the washing tub 120 may vary to thereby form rhythm water flows, and to resultantly realize the rhythmic washing. That is, when the rotation speeds of the pulsator 130 and the washing tub 120 are controlled to be rapidly variable, strong water flows and rhythmic water flows can be formed to thereby prevent damage to the laundry.

In addition, the pulsator 130 and the washing tub 120 can be rotated with a time difference to form a variety of wash water flows, and thus a wide range of washing water flows can be formed.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to a washing machine motor and a washing machine using the same, particularly to a full-automatic washing machine, in which a washing tub and a pulsator are separately driven to thereby form a variety of washing water flows.

The invention claimed is:

1. A washing machine motor comprising:
an inner rotor;
an outer rotor;
a double stator disposed with an air gap between the inner rotor and the outer rotor, and independently and selectively controlling the inner rotor and the outer rotor and driving the inner rotor and the outer rotor selectively and independently from each other;
a first cylindrical outer shaft connected to the inner rotor;
a second cylindrical outer shaft connected to a washing tub;
a first inner shaft rotatably disposed inside the first cylindrical shaft and connected to the outer rotor;
a second inner shaft rotatably disposed inside the second cylindrical shaft and connected to a pulsator inside the washing tub;
a planetary gear set comprising: a ring gear fixedly coupled to the first cylindrical outer shaft and the second cylindrical outer shaft; a sun gear fixedly coupled to the first inner shaft; a plurality of planetary gears rotatably engaged with an outer surface of the sun gear and an inner surface of the ring gear; and a carrier coupled to the second inner shaft and rotatably supporting the planetary gears, wherein the planetary gear set is configured in such a way that, when a rotational force from the outer rotor is applied to the sun gear through the first inner shaft, a rotational speed of the outer rotor is decelerated through the planetary gears and is transmitted to the pulsator through the carrier and the second inner shaft; and, when a rotational force from the inner rotor is applied to the ring gear through the first cylindrical outer shaft, a rotational speed of the inner rotor is not decelerated and is transmitted to the washing tub through the ring gear and the second cylindrical outer shaft;
a first bearing mounted on an outer surface of the first cylindrical outer shaft and a second bearing mounted on an outer surface of the second cylindrical outer shaft in such a way that the planetary gear set is able to rotate in both directions; and
a control unit configured to control the double stator in such a manner that, when under a washing mode, the outer rotor and the inner rotor are driven in opposite directions to each other simultaneously or with a time delay to thereby generate a vortex water flow due to water flows by the pulsator and the washing tub rotating in opposite directions, and when under a dewatering mode, the outer rotor and the inner rotor are driven simultaneously in a same direction,
wherein the stator comprises: a plurality of stator cores that are made of a split type and are assembled in an annular form; bobbins that are wrapped on respective outer circumferential surfaces of the plurality of stator cores; a first coil wound on one side of each of the stator cores; a second coil wound on the other side of each of the stator cores; and a stator support in which the plurality of stator cores are arranged in an annular shape and the first bearing is provided,
wherein the stator support comprises:
a core fixing portion in which the stator cores are arranged and fixed in the annular form;
a first bearing mounting portion that is extended inwardly from the core fixing portion and in which the first bearing is provided;
an outer tub fixing portion that is extended outwardly from the core fixing portion and that is fixed to the outer tub;
a first alignment projection that is extended in cylindrical shape upwardly from the stator support and is in contact with an inner surface of a bearing housing to which the second bearing is mounted; and
a second alignment projection that is formed with a gap outwardly from the first alignment projection and is in contact with a lower surface of a flat portion of the bearing housing.

2. The washing machine motor of claim 1, wherein each of the stator cores comprises:
a first tooth portion on which the first coil is wound;
a second tooth portion formed in opposition to the first tooth portion and on which the second coil is wound;
a partition that partitions between the first tooth portion and the second tooth portion; and
couplers that are formed at both ends of the partition and interconnect the stator cores adjacent to each other.

3. The washing machine motor of claim 1, wherein the stator support is integrally formed with the stator cores by insert molding.

4. A washing machine comprising:
a washing machine motor according to claim 1; and
an outer tub that accommodates wash water;
wherein the washing tub rotatably disposed inside the outer tub to thus perform the washing mode and the dewatering mode; and
the pulsator rotatably disposed inside the washing tub to thus form wash water flows.

5. The washing machine of claim 4, wherein the pulsator and the washing tub are driven in different directions and at different speeds from each other.

6. The washing machine of claim 4, wherein the pulsator and the washing tub are driven in an identical direction to each other and at different speeds from each other.

\* \* \* \* \*